(No Model.)

2 Sheets—Sheet 1.

G. D. BURTON.
STOCK CAR.

No. 251,695.

Patented Jan. 3, 1882.

WITNESSES
F. F. Robinson
N. W. Fuller

INVENTOR
George D. Burton
By George D. Burton
Attorney (No Model.) 2 Sheets—Sheet 2.

G. D. BURTON.
STOCK CAR.

No. 251,695. Patented Jan. 3, 1882.

WITNESSES
F. F. Robinson
H. W. Fuller

INVENTOR
George D. Burton
By George D. Burton
Attorney

UNITED STATES PATENT OFFICE.

GEORGE D. BURTON, OF NEW IPSWICH, NEW HAMPSHIRE, ASSIGNOR OF ONE-HALF TO JOEL M. HOLDEN, OF BOSTON, MASSACHUSETTS.

STOCK-CAR.

SPECIFICATION forming part of Letters Patent No. 251,695, dated January 3, 1882.

Application filed August 30, 1880. (No model.)

*To all whom it may concern:*

Be it known that I, GEORGE D. BURTON, a citizen of the United States, residing at New Ipswich, in the county of Hillsborough and State of New Hampshire, have invented certain new and useful Improvements in Stock-Cars,) which have not been patented to myself or to others with my consent or knowledge in any foreign country;) and I do hereby declare that the following is a full, clear, and exact description of the invention, which will enable others to make and use the same.

My invention relates to improvement in cars for carrying stock or cattle, preventing the unloading to feed and water and reloading, thus saving time and expense and relieving the animals from their present cruel treatment in carrying them long distances without food and water, and in unnecessary unloading them for that purpose and reloading.

Heretofore cattle have been carried packed tight in cars without food or water for long distances, and when unloaded for feeding and watering, besides a serious loss of time, great difficulty is experienced and cruelty used in forcing them back again into the cars.

By my improvement each animal can lie down separately, is properly fed and watered in the cars, has sufficient space and air, and they are carried at less expense and without loss of time. I attain these objects by the devices and arrangements illustrated in the accompanying drawings, in which—

Figure 1:
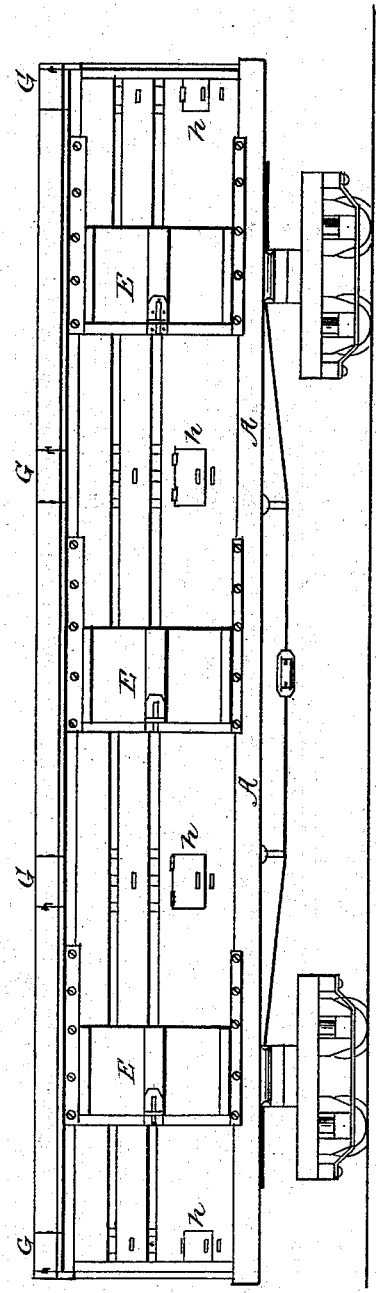
Figure 2:
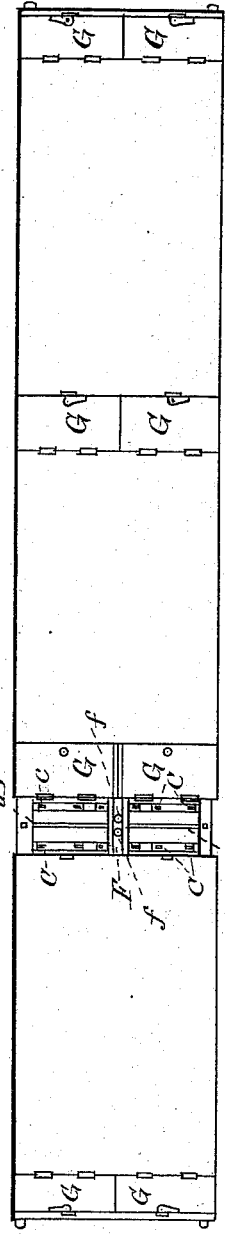
Figure 3:
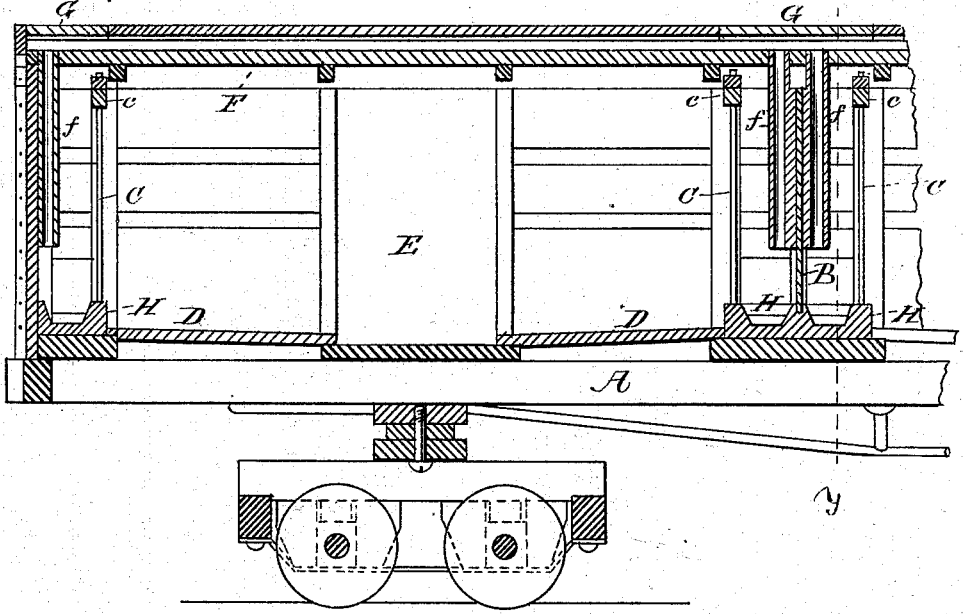
Figure 4:
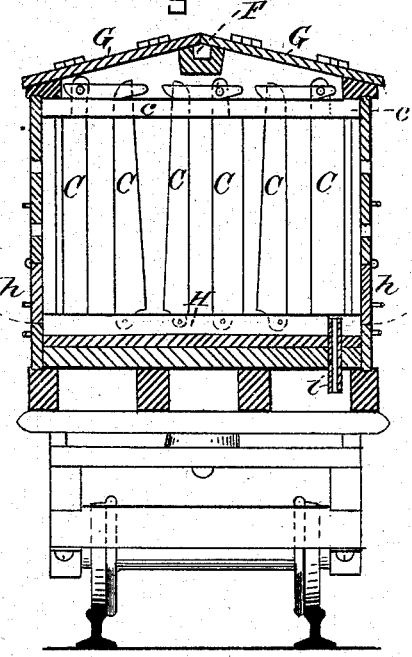

Figure 1 is a side elevation of the stock-car. Fig. 2 is a plan of the same. Fig. 3 is a longitudinal vertical section of one end, and Fig. 4 is a cross-section on the line Y Y of Fig. 3.

A represents the car-body; B, the partitions dividing the car into compartments; C, the stanchion-bars, pivoted at their lower ends in the side of the troughs H and locked in the upper frame, c, serving to keep the animals in place.

D represents the inclined raised floors on the bottom of the car, extending to the central doorways, tending to preserve cleanliness.

In the middle of each compartment are doorways E, on each side of the car, (with doors sliding in opposite directions,) for greater convenience in loading and unloading.

The ridge-beam F of the car-body is trough-shaped. In this trough the water is received from the roadside water-crane. From thence it is conducted by the vertical pipes $ff$ into the drinking-troughs H. The troughs or pipes may be made of wood or metal. Doorways G G in the top of the car, and directly over the stanchions and drinking-troughs, allow the filling of the ridge-beam trough with water, and the fastening of the cattle in the stanchions, and afford additional ventilation. A tube entering into the ridge-beam trough, with a flanged mouthpiece to receive the roadside water-crane pipe, may be placed in the middle of the top of the car to supply the water, instead of supplying through said top doors, if desirable.

The drinking-troughs H may be used as feeding-troughs, and the doorways $h$ are for convenience in supplying hay or fodder, and for ventilation.

Instead of and in place of the cattle stanchions, ropes or chains may be used, attached at one end to the side of the car, and then looped over the horns or necks of the cattle and the necks of horses in succession, and fastened to the other side of the car to keep the animals in place. By the use of the stanchions or the looped ropes or chains each animal can lie down at pleasure without regard to the other animals.

A waste-pipe, $i$, leading from the drinking-troughs carries off the surplus water.

The car may be made preferably of the length of forty-eight feet, having three compartments, each compartment carrying at each end thereof three cattle, or six in each compartment, and in the three compartments eighteen cattle, the width of the usual size. These measurements may be varied. In this way the cattle may be carried with comfort to themselves, at much less expense, and without loss of time, and will arrive at the end of their journey in as good condition as when placed in the cars.

Having described my invention, what I claim as new therein, and desire to secure by Letters Patent, is—

1. In a cattle-car, the combination, with the car-body A, of the transverse partitions B, dividing the car into compartments, the cattle-stanchions arranged parallel to the partitions, on each side thereof, the transverse feed-troughs extending across the car below the partitions, and the doors h on each side of the car, opposite the feed-troughs, all constructed and arranged substantially as described.

2. In a cattle-car, a ridge-pole provided with a groove or trough on its upper side, and with suitable pipe-connections, whereby it is adapted to serve as a water-conductor for supplying the feeding-troughs, substantially as described.

GEO. D. BURTON.

Witnesses:
EUGENE F. ADAMS,
HENRY O. PRESTON.